(12) United States Patent
Kuroki

(10) Patent No.: US 10,924,055 B2
(45) Date of Patent: Feb. 16, 2021

(54) MOTOR DRIVE APPARATUS HAVING INPUT POWER SUPPLY VOLTAGE ADJUSTMENT FUNCTION

(71) Applicant: FANUC CORPORATION, Yamanashi (JP)

(72) Inventor: Wataru Kuroki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/458,194

(22) Filed: Jul. 1, 2019

(65) Prior Publication Data

US 2020/0052642 A1 Feb. 13, 2020

(30) Foreign Application Priority Data

Aug. 10, 2018 (JP) .............................. JP2018-151642

(51) Int. Cl.
| | | |
|---|---|---|
| G05B 5/00 | (2006.01) | |
| H02P 29/60 | (2016.01) | |
| H02P 27/06 | (2006.01) | |
| H02H 7/08 | (2006.01) | |
| H02M 3/158 | (2006.01) | |
| H02P 29/02 | (2016.01) | |
| H02P 1/46 | (2006.01) | |
| H02M 1/00 | (2006.01) | |

(52) U.S. Cl.
CPC ............ *H02P 29/60* (2016.02); *H02H 7/0833* (2013.01); *H02M 3/158* (2013.01); *H02P 1/46* (2013.01); *H02P 27/06* (2013.01); *H02P 29/02* (2013.01); *H02M 2001/0067* (2013.01)

(58) Field of Classification Search
CPC ........... H02P 27/06; H02P 29/02; H02P 29/60
See application file for complete search history.

(56) References Cited

U.S. PATENT DOCUMENTS

2012/0315041 A1* 12/2012 Yoon ................... H04B 10/272
398/58

FOREIGN PATENT DOCUMENTS

| CN | 102307034 A | 1/2012 |
|---|---|---|
| CN | 105471237 A | 4/2016 |
| JP | H2-138084 A | 5/1990 |
| JP | 05052604 A * | 3/1993 |
| JP | h8308251 A | 11/1996 |
| JP | H9149690 A | 6/1997 |
| JP | 2002199787 A | 7/2002 |
| JP | 2009-261078 A | 11/2009 |
| JP | 2013234028 A | 11/2013 |
| JP | 2015-167436 A | 9/2015 |

* cited by examiner

*Primary Examiner* — Karen Masih
(74) *Attorney, Agent, or Firm* — Hauptman Ham, LLP

(57) ABSTRACT

A motor drive apparatus includes an AC stabilized power supply configured to convert AC voltage of a commercial AC power source into input power supply voltage according to a received voltage command value and output the input power supply voltage, a converter configured to convert the input power supply voltage into DC voltage and output the DC voltage to a DC link, an inverter configured to convert the DC voltage at the DC link into AC voltage for driving a motor, and an input power supply voltage control unit configured to control the input power supply voltage that is output by the AC stabilized power supply.

11 Claims, 7 Drawing Sheets

FIG. 2

| INPUT POWER SUPPLY VOLTAGE TO CONVERTER | CONVERTER TEMPERATURE | INVERTER TEMPERATURE | MOTOR TEMPERATURE |
|---|---|---|---|
| INCREASE | FALL | RISE | FALL |
| DECREASE | RISE | FALL | RISE |

MOTOR DRIVE APPARATUS HAVING INPUT POWER SUPPLY VOLTAGE ADJUSTMENT FUNCTION

RELATED APPLICATIONS

The present application claims priority of Japanese Application Number 2018-151642, filed Aug. 10, 2018, the disclosure of which is hereby incorporated by reference herein in its entirety.

BACKGROUND OF THE INVENTION

1. Field of the Invention

The present invention relates to a motor drive apparatus having an input power supply voltage adjustment function.

2. Description of the Related Art

A motor drive apparatus that drives a motor in a machine tool, forging machinery, an injection molding machine, industrial machinery, or a variety of robots, converts, by a converter (a rectifier), AC power that is supplied from an AC power source into DC power and outputs the DC power to a DC link, then, converts, by an inverter, the DC power in the DC link into AC power and supplies this AC power as driving power to a motor that is provided for each drive axis.

In the motor drive apparatus, the inverter that supplies driving power to the motor includes a bridge circuit of power devices (semiconductor switching devices) and diodes that are connected in anti-parallel to the power devices. The inverter converts the input DC voltage (i.e., the DC voltage at the DC link) into AC voltage for driving a motor by on-off driving the internal power devices in accordance with a switching command that is received from a motor control unit. As for the converter that converts (rectifies) input power supply voltage into DC voltage and outputs the DC voltage to the DC link the motor drive apparatus, diode rectifiers have been widely used, while converters of a pulse width modulation (PWM) control method that can return regenerative power generated during deceleration of a motor to an AC power source side are also used these days. The converter of the PWM control method includes a bridge circuit of power devices and diodes that are connected in anti-parallel to the power devices.

When the motor drive apparatus drives a motor, the converter, the inverter and the motor generate heat due to electric current flowing through the converter, the inverter and the motor. In addition, the inverter and the converter of the PWM control method also generate heat caused by switching operations of the power devices. The heat generated by the converter, the inverter and the motor causes a drop in the power factor or malfunction of the motor drive apparatus, resulting in damages and shortened lives of the motor drive apparatus and a variety of peripheral devices. As such, various measures against heat generation are taken in operation of the motor drive apparatus.

For example, as described in Japanese Unexamined Patent Publication No. 2015-167436, a numerical controller that includes a cooling function and is provided in a motor drive that drives at least one motor is known, which includes: a temperature acquisition unit that acquires temperature of a component in the motor unit of the motor drive from a temperature detector equipped in the motor drive; an ambient temperature acquisition unit that acquires ambient temperature of the motor unit of the motor drive from a temperature detector equipped in the motor drive; an input energy acquisition unit that acquires input energy to the component; an output energy acquisition unit that acquires output energy from the component; a heat radiation characteristic estimation unit that estimates heat radiation characteristics of the component, based on the temperature of the component, the ambient temperature, the input energy and the output energy; and a heat radiation characteristic output unit that outputs the estimated heat radiation characteristics of the component as a normal/abnormal determination signal of the cooling function.

For example, as described in Japanese Unexamined Patent Publication No. 2009-261078, a motor controller is known, which includes: a converter that converts AC voltage into DC voltage; an inverter that converts the DC voltage into AC voltage and drives a motor; a speed control unit that generates a torque command based on a speed command and motor speed; a torque control unit that generates a PWM signal based on the torque command and motor current to drive the inverter; a current detection unit that detects the motor current; an inverter temperature detection unit that detects temperature of the inverter and generates an inverter temperature signal; and an overload protection unit that generates a torque control signal, based on a motor temperature signal, the inverter temperature signal, the motor current, and the motor speed, the overload protection unit includes: a power element loss estimation unit that generates estimated loss in a power element of the inverter from the motor current; a junction temperature estimation unit that estimates junction temperature, based on the estimated power element loss and the inverter temperature; a motor loss estimation unit that estimates motor loss from the motor current and the motor speed; a coil temperature estimation unit that estimates coil temperature from the estimated motor loss and the motor temperature signal; and an overload processing unit that generates a torque limit signal or an alarm signal, based on the estimated junction temperature and the estimated coil temperature.

For example, as described in Japanese unexamined Patent Publication No. 02-138084, an elevator emergency operation method in the event of a power failure is known, which is preferably used to improve a ride during emergency rescue operation.

SUMMARY OF INVENTION

Heat generated by a converter, an inverter and a motor of a motor drive apparatus causes a drop in the power factor or malfunction of the motor drive apparatus, resulting in damages and shortened lives of the motor drive apparatus and a variety of peripheral devices. For example, in the motor drive apparatus, as the voltage at a DC link (hereinafter, simply referred to as the "DC link voltage") located between the converter and the inverter is larger, the output of the motor can be increased; on the other hand, the switching loss of the inverter is increased and heat generated from the inverter rises. In addition, for example, when the motor is driven while maintaining a certain motor output, as the DC link voltage of the motor drive apparatus is higher, the current that flows in the converter and the motor decreases, which suppresses heat generation therefrom; however, heat generated from the inverter rises and the actual resolution of a voltage command to the inverter decreases, resulting in degrading accuracy in motor control. Whereas, when the motor is driven while maintaining a certain motor output, as the DC link voltage of the motor drive apparatus is lower, heat generated from the inverter becomes lower and the actual resolution of a voltage command to the inverter is improved, enabling motor control with high accuracy; however, heat generated from the converter and the motor becomes higher. Therefore, a technique that allows efficient motor control while suppressing heat generation from each unit is desired for the motor drive apparatus.

According to one aspect of the present disclosure, the motor drive apparatus includes: an AC stabilized power supply configured to convert AC voltage of a commercial AC power source into input power supply voltage according to a received voltage command value and output the input power supply voltage; a converter configured to convert the input power supply voltage into DC voltage and output the DC voltage to a DC link; an inverter configured to convert the DC voltage at the DC link into AC voltage for driving a motor and output the AC voltage; a temperature acquisition unit configured to acquire temperature of at least one of the converter and the inverter; and an input power supply voltage control unit configured to control the input power supply voltage that is output by the AC stabilized power supply according to the temperature acquired by the temperature acquisition unit.

BRIEF DESCRIPTION OF THE DRAWINGS

The present invention will be more clearly understood with reference to the following accompanying drawings:

FIG. 2 is a diagram illustrating a relationship among input power supply voltage to a converter, temperature of the converter, temperature of an inverter, and temperature of a motor;

DETAILED DESCRIPTION

Figure 1:
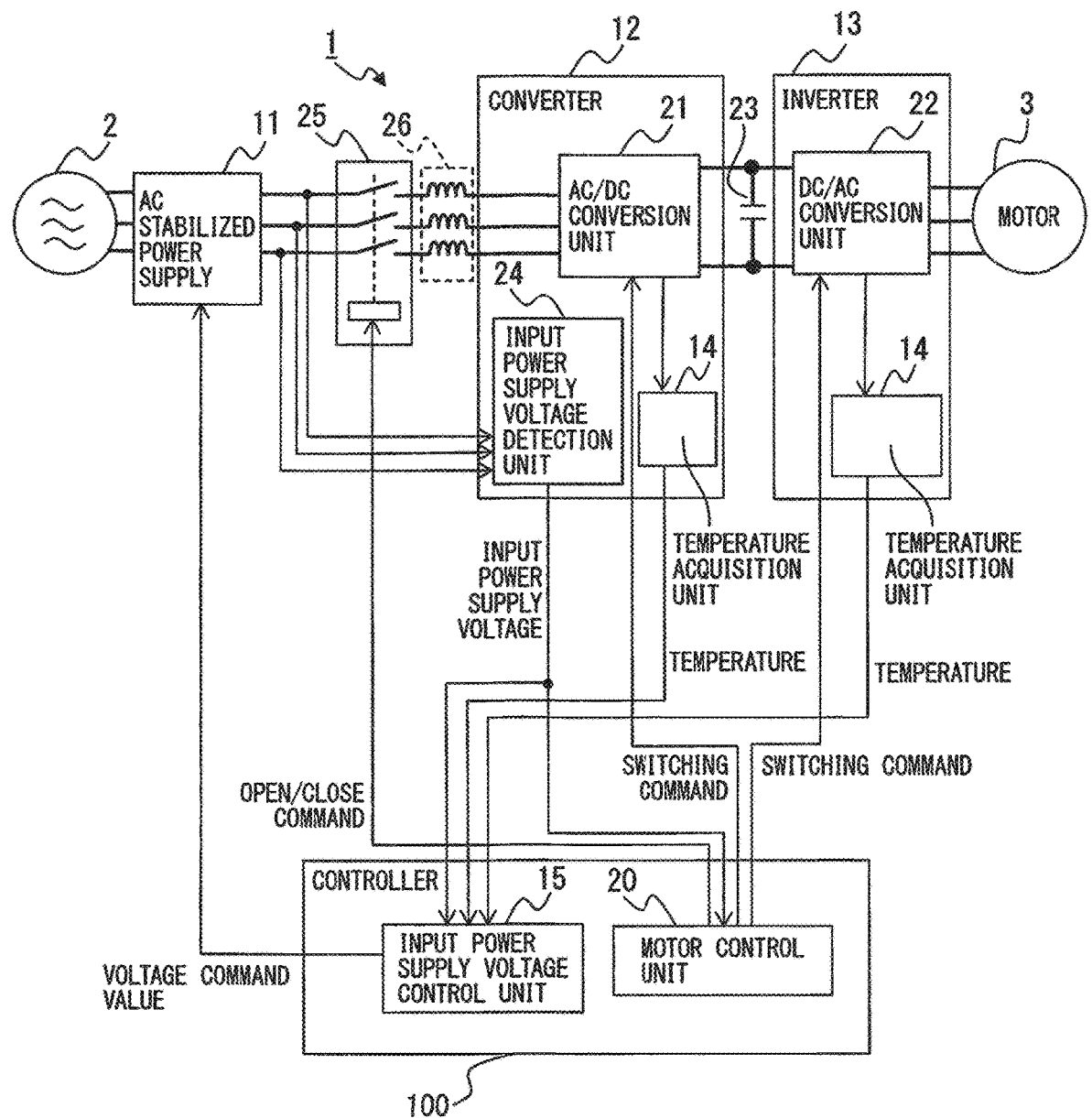
FIG. 1 is a diagram for illustrating a motor drive apparatus according to a first embodiment of the present disclosure.

The following will describe a motor drive apparatus having an input power supply voltage adjustment function with reference to the drawings. These drawings use different scales as appropriate to facilitate understanding of the invention. The modes illustrated in the drawings are only examples for carrying out the invention without limitation thereto.

FIG. 1 is a diagram for illustrating a motor drive apparatus according to a first embodiment of the present disclosure.

As an example, a case where a motor drive apparatus 1 that is connected to a commercial AC power source 2 controls one AC motor (hereinafter, simply referred to as the "motor") 3 will be described. The number of the motors 3 does not particularly limit the present embodiment and may be a different number. Note that the numbers of phases of the commercial AC power source 2 and the motor 3 do not particularly limit the present embodiment, and a three-phase or single-phase configuration, for example, may be used. Examples of the commercial AC power source 2 include a three-phase AC 400 V power source, a three-phase AC 200 V power source, a three-phase AC 600 V power source, and a single-phase 100 V power source. In addition, the type of the motor 3 does not particularly limit the present embodiment and may be, for example, an induction motor, or a synchronous motor. Machines in which the motor 3 is equipped include, for example, machine tools, robots, forging machinery, injection molding machines, industrial machinery, various electrical appliances, electric trains, automobiles and aircrafts.

As illustrated in FIG. 1, the motor drive apparatus 1 according to the present embodiment includes an AC stabilized power supply 11, a converter 12, an inverter 13, a temperature acquisition unit 14, an input power supply voltage control unit 15, and a motor control unit 20. In the example of the drawings, the input power supply voltage control unit 15 and the motor control unit 20 are provided inside the controller 100. The controller 100 may be, for example, a numerical controller of a machine tool.

Further, in the same way as general motor drive apparatuses, the motor control unit 20 in the motor drive apparatus 1 controls the inverter 13 that convers power between DC power in a DC link and AC power as the driving power or regenerative power of the motor 3. In other words, the motor control unit 20 generates a switching command for controlling the speed, torque, or rotor position of the motor 3, based on the speed of the motor 3 (speed feedback), current flowing through the coil of the motor 3 (current feedback), a predetermined torque command, and an operation program of the motor 3. In accordance with the switching command created by the motor control unit 20, the power conversion operation of the inverter 13 is controlled. In addition, the motor control unit 20 controls the open/close operation of a magnetic contactor 25.

The AC stabilized power supply 11 converts AC voltage of the commercial AC power source 2 into input power supply voltage according to a received voltage command value and outputs the input power supply voltage. In general, the value and waveform of AC voltage that are obtained from the commercial AC power source 2 are affected by impedance or other factors of a feeder and a variety of loads connected to the feeder. Whereas, the AC stabilized power supply 11 can output stable AC voltage in accordance with the voltage command value by eliminating, if any, the influence of variance in the value and waveform of the input AC voltage. In the present embodiment, the AC stabilized power supply 11 is provided between the commercial AC power source 2 and the converter 12, and the AC voltage output from the AC stabilized power supply 11 serves as the input power supply voltage to the converter 12. The AC voltage output from the AC stabilized power supply 11 (i.e., the input power supply voltage to the converter 12) is controlled by the input power supply voltage control unit 15, which will be described later. Thus, the AC stabilized power supply 11, based on the voltage command value received from the input power supply voltage control unit 15 and the input power supply voltage detected by the input power supply voltage detection unit 24, converts AC voltage that is input from the commercial AC power source 2 into AC voltage in accordance with the voltage command value received from the input power supply voltage control unit 15, and outputs the AV voltage as the input power supply voltage to the converter 12. As such, the converter 12 receives a supply of stable input power supply voltage from the AC stabilized power supply 11 in accordance with the voltage command value. Specific examples of the AC stabilized power supply 11 include an AC stabilizer (AVR) and a frequency converter (CVCF). The AC stabilizer may be the one including a multi tap transformer and a semiconductor switch based on a tap switch system, the one including a variable autotransformer and a servo motor based on a variable autotransformer system, the one including a semiconductor switch and a resonance circuit based on a phase control system, and the one based on a linear power amplifier system. The frequency converter may be the one based on an inverter system and the one based on a linear power amplifier system. The AC voltage range that can be generated by the AC stabilized power supply 11 may be, for example, a range from 200 V to 240 V or a range from 380 V to 480 V.

The converter 12 converts the input power supply voltage supplied from the AC stabilized power supply 11 into DC voltage and outputs the DC voltage to the DC link. The converter 12 has an AC/DC conversion unit 21, an input power supply voltage detection unit 24, and a temperature acquisition unit 14. Note that while, in FIG. 1, the input power supply voltage detection unit 24 is provided inside the converter 12 as an example, it may be provided outside of the converter 12.

The AC/DC conversion unit 21 in the converter 12, which can convert AC power into DC power, may be, for example, a diode rectification circuit, a 120-degree conduction-type rectification circuit, or a rectification circuit controlled by PWM switching that incorporates switching devices. The AC/DC conversion unit 21 is implemented in a three-phase bridge circuit when the input power supply voltage is three-phase voltage, while the AC/DC conversion unit 21 is implemented in a single-phase bridge circuit when the input power supply voltage is single-phase voltage. When the AC/DC conversion unit 21 is a rectification circuit that is controlled by PWM switching, it includes a bridge circuit of power devices and diodes that are connected in anti-parallel to the power devices. In such a case, examples of the power device may include an insulated gate bipolar transistor (IGBT), a thyristor, a Gate Turn-Off thyristor (GTO), a silicon carbide (SiC), a transistor, and the like, provided, however the type of the power device does not limit the present embodiment and the power device may be of any kind other than above.

The input power supply voltage detection unit 24 detects the value of the input power supply voltage to the converter 12 (i.e., AC voltage that is output from the AC stabilized power supply 11). The value of the input power supply voltage detected by the input power supply voltage detection unit 21 is sent to the input power supply voltage control unit 15 to be used for controlling the AC stabilized power supply 11, as well as, sent to the motor control unit 20 to be used for controlling power conversion of the AC/DC conversion unit 21 in the converter 12 and the DC/AC conversion unit 22 in the inverter 13.

The magnetic contactor 25 and an AC reactor 26 are connected to the AC input side of the converter 12. The magnetic contactor 25 opens/closes a circuit that connects between the AC stabilized power supply 11 and the converter 12 in accordance with a command received from the motor control 20. To be specific, a close operation that electrically connects the AC stabilized power supply 11 and the converter 12 is realized when the contact of the magnetic contactor 25 is closed, and an open operation that electrically shuts off between the AC stabilized power supply 11 and the converter 12 is realized when the contact of the magnetic contactor 25 is opened. Note that, instead of the magnetic contactor 25, for example, a relay or a power semiconductor switching device may be used to shut off the flow of AC power from the AC stabilized power supply 11 to the converter 12 when a close command is received from the motor control unit 20.

The DC output side of the converter 12 and the DC input side of the inverter 13 are connected in parallel through the DC link. The DC link is equipped with a DC link capacitor 23. The DC link capacitor 23 has functions to suppress ripples of the DC voltage that is output from the converter 12, as well as, to store DC power in the DC link. Examples of the DC link capacitor 23 include, for example, an electrolytic capacitor and a film capacitor. Note that, although the DC link voltage is used by the motor control unit 20 for controlling the inverter 13, depiction of a detection unit for detecting the DC link voltage is omitted in FIG. 1.

The inverter 13 converts DC voltage at the DC link into AC voltage for driving the motor and outputs the AC voltage. The inverter 13 has a DC/AC conversion unit 22 and a temperature acquisition unit 14.

The DC/AC conversion unit 22 in the inverter 13 that can convert DC power to AC power may be, for example, a PWM inverter circuit that incorporates switching devices. The DC/AC conversion unit 22 is implemented in a three-phase bridge circuit when the motor 3 is a three-phase AC motor, or implemented in a single-phase bridge circuit when the motor 3 is a single phase motor. The DC/AC conversion unit 22 converts DC voltage at the DC link into AC voltage for driving the motor in response to a command from the motor control unit 20 and outputs the AC voltage to the motor 3, as well as, converts the AC voltage regenerated by the motor 3 into DC voltage and returns the DC voltage to the DC link side when the motor is regenerating. When the DC/AC conversion unit 22 is configured by a PWM inverter circuit, it includes a bridge circuit of power devices and diodes that are connected in anti-parallel to the power devices. In such a case, examples of the power device may include an IGBT, a thyristor, a Gate Turn-Off thyristor (GTO), a silicon carbide (SiC), a transistor, and the like, while the type of the power device does not limit the present embodiment and the power device may be of any kind other than above.

The temperature acquisition unit 14 acquires temperature of at least one of the converter 12 and the inverter 13. While, in the example illustrated in FIG. 1, the temperature acquisition units 14 are provided in both converter 12 and inverter 13 to acquire both temperatures of the converter 12 and inverter 13, any one of the temperature acquisition units 14 may be omitted as in the examples of the input power supply voltage control as will be described later.

The temperature acquisition unit 14 is configured by, for example, a temperature sensor. The temperature sensor as the temperature acquisition unit 14 is provided near the power devices in the AC/DC conversion unit 21 of the converter 12 or near a heatsink of the converter 12 to detect the temperature of the converter 12. The detected temperature of the converter is sent to the input power supply voltage control unit 15. Likewise, a temperature sensor as the temperature acquisition unit 14 is provided, for example, near the power devices in the DC/AC conversion unit 22 of the inverter 13 or near a heatsink of the inverter 13 to detect the temperature of the inverter 13. The detected temperature of the converter 12 is sent to the input power supply voltage control unit 15. The temperature acquisition unit 14 equipped in the converter 12 and the inverter 13 may be provided as a plurality of temperature sensors near the power devices and the heatsink or as only one temperature sensor. For example, when a plurality of temperature sensors are provided in the converter 12, a plurality of temperatures are detected, and the highest temperature among the plurality of temperatures may be considered as the temperature of the converter 12 acquired by the temperature acquisition unit 14. Likewise, for example, when a plurality of temperature sensors are provided in the inverter 13, a plurality of temperatures are detected, and the highest temperature among the plurality of temperatures may be considered as the temperature of the inverter 13 acquired by the temperature acquisition unit 14.

Alternatively, instead of the actual measurement by the above-described temperature sensor, the temperature of the converter 12 and/or the inverter 13 may be acquired by estimation based on a software simulation. In such a case, the function of the temperature acquisition unit 14 is realized when a temperature estimation program is executed by a processor, such as microprocessor unit (MPU) and digital signal processor (DSP). The temperature acquisition unit 14 that operates in accordance with the temperature estimation program is provided within the processor of the controller 100 or a processor in an external computer (not illustrated in the drawings). For example, the temperature estimation program may prescribe a correspondence between the content of a switching operation of each power device of the converter 12 and/or the inverter 13 and temperature (or temperature rising rate) or a calculation equation thereof, and a processor as the temperature acquisition unit 14 acquires a switching command that is actually output from the motor control unit 20 and estimates the temperature of the converter 12 and/or inverter 13 in accordance with the temperature estimation program.

The input power supply voltage control unit 15 controls the "input power supply voltage to the converter 12," which is output by the AC stabilized power supply 11 according to the temperature acquired by the temperature acquisition unit 14. As such, according to the temperature acquired by the temperature acquisition unit 14, the input power supply voltage control unit 15 generates a voltage command value for controlling the input power supply voltage that is output by the AC stabilized power supply 11 and transmits the voltage command value to the AC stabilized power supply 11. Although, in the examples of the drawings, the input power supply voltage control unit 15 is provided inside the controller 100, it may be provided in a processor outside of the controller 100.

A relationship among the input power supply voltage of the converter 12, the temperature of the converter 12, the temperature of the inverter 13, and the motor 3 will be described below.

FIG. 2 is a diagram illustrating a relationship among the input power supply voltage of the converter, the temperature of the converter, the temperature of the inverter, and the temperature of the motor.

When the motor drive apparatus 1 is driving the motor 3 at a constant output, if the input power supply voltage of the converter 12 is increased, the DC link voltage (when the AC/DC conversion unit 21 in the converter 12 is a full-wave rectifying circuit, the input/output voltage peak value×√2) increases and current flowing in the converter 12 and current flowing in the motor 3 decrease. As the result, the temperature of the converter 12 and the temperature of the motor 3 decrease. At the same time, as the DC link voltage becomes higher, switching loss of the inverter 13 increases, and the temperature of the inverter 13 increases. Further, regardless of the constant drive of the motor 3, when the motor 3 is driven while increasing the input power supply voltage of the converter 12, the inverter 13 converts high DC link voltage into AC voltage for driving the motor 3, thus, the AC voltage and the output of the motor 3 are increased.

When the motor drive apparatus 1 is driving the motor 3 at a constant output, if the input power supply voltage of the converter 12 is decreased, the DC link voltage decreases and current flowing in the converter 12 and current flowing in the motor 3 increase. As the result, the temperature of the converter 12 and the temperature of the motor 3 increase. At the same time, as the DC link voltage becomes lower, switching loss of the inverter 13 decreases, and the temperature of the inverter 13 decreases. Further, the inverter 13 converts low DC link voltage into AC voltage for driving the motor 3 while maintaining a constant motor 3 output, thus, the actual resolution of a voltage command to the inverter 13 is improved, enabling highly accurate control of the motor 3.

In this way, depending on an increase/decrease of the input power supply voltage of the converter 12, the temperature of the converter 12, inverter 13 and motor 3 fluctuate, changing the output size of the motor 3 and accuracy in controlling the motor 3. Thus, according to the present embodiment, the AC stabilized power supply 11 that can output AC voltage in accordance with a command, supplies input power supply voltage to the converter 12 and controls the temperature of the converter 12, inverter 13 and/or motor 3 by controlling this input power supply voltage. Therefore, the input power supply voltage control unit 15 of the present embodiment controls input power supply voltage, to the converter 12, that is output by the AC stabilized power supply 11 according to the temperature of the converter 12 and/or inverter 13 acquired by the temperature acquisition unit 14.

The way of increasing/decreasing input power supply voltage to the converter 12 may be set as appropriate according to the use purpose of the motor drive apparatus 1 and surrounding environment. For example, the control content of the input power supply voltage to the converter 12 is determined depending on: how temperature of the converter 12 and the inverter 13 is desired to be controlled; whether the motor 3 is required to output a large volume; whether the motor control requires high accuracy, or the like. The following will list examples of control of input power supply voltage to the converter 12.

Figure 3:
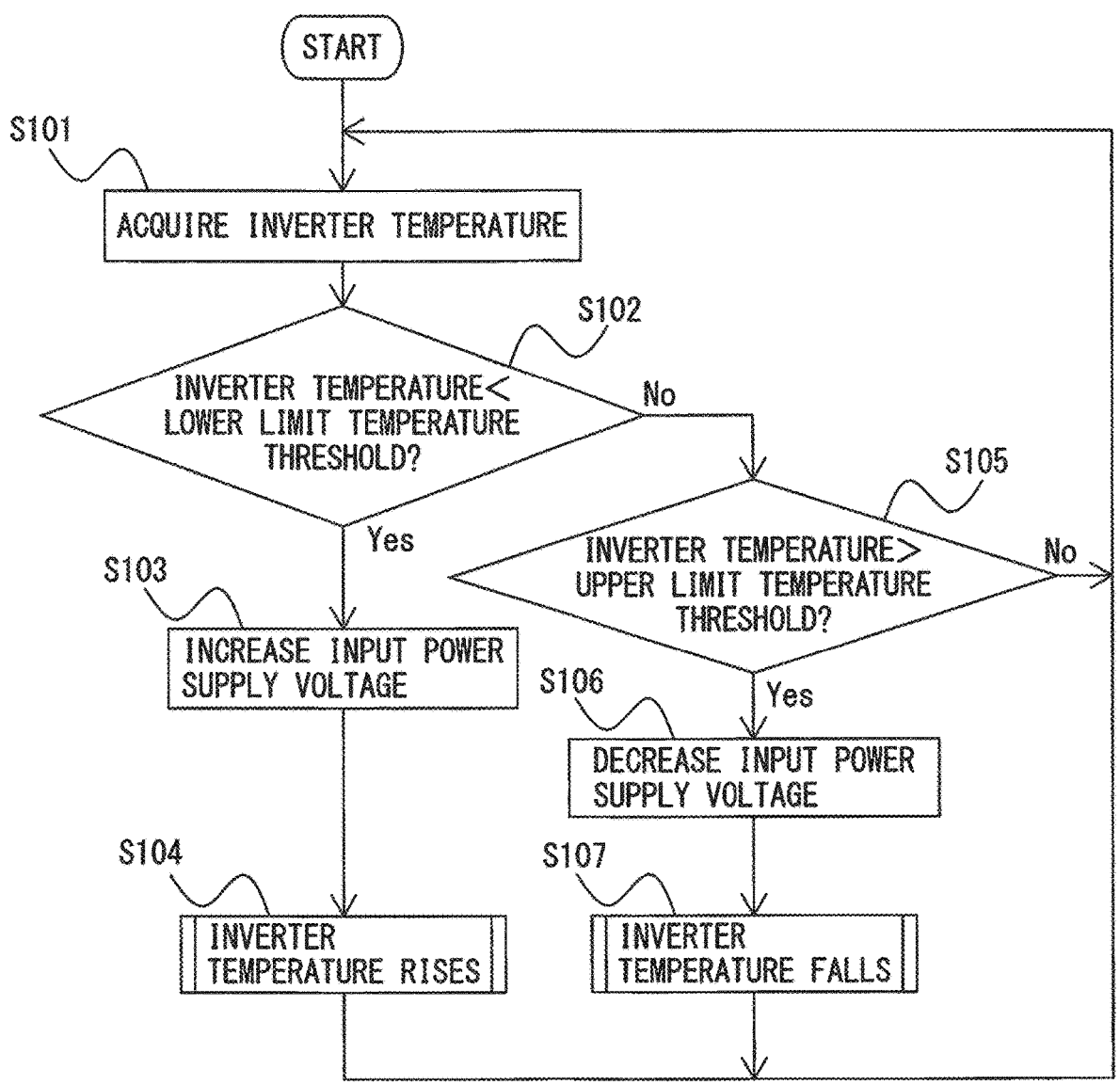
FIG. 3 is a flowchart indicating a first mode of input power supply voltage control of a motor drive apparatus according to the first embodiment of the disclosure.

First, a first mode of controlling input power supply voltage to the converter 12 will be described. In the first mode, input power supply voltage to the converter 12 is controlled so that the temperature of the inverter 13 can be raised to the highest extent possible. According to the first mode, the output of the motor 3 can be enlarged while preventing excessive heat generation from the inverter 13. FIG. 3 is a flowchart indicating the first mode of input power supply voltage control of the motor drive apparatus according to the first embodiment of the disclosure.

In the motor drive apparatus 1 of the present embodiment, when the magnetic contactor 25 performs a close operation so as to electrically connect the AC stabilized power supply 11 and the converter 12, and the motor control unit 20 drives the motor 3 by controlling a power conversion operation of the converter 12 and the inverter 13, at step S101, the temperature acquisition unit 14 acquires the temperature of the inverter 13. The acquired temperature of the inverter 13 is informed to the input power supply voltage control unit 15.

At step S102, the input power supply voltage control unit 15 determines whether the temperature of the inverter 13 acquired by the temperature acquisition unit 14 is lower than a preset inverter lower limit temperature threshold. When the temperature of the inverter 13 is determined as being lower than the inverter lower limit temperature threshold, the process advances to step S103, or, when the temperature of the inverter 13 is not determined as being lower than the inverter lower limit temperature threshold, the process advances to step S105. The inverter lower limit temperature threshold may be set to a value smaller than the inverter upper limit temperature threshold as will be described later. The difference between the inverter upper limit temperature threshold and the inverter lower limit temperature threshold is equivalent to the hysteresis width of the temperature of the inverter 13.

At step S102, when the temperature of the inverter 13 is determined as being lower than the inverter lower limit temperature threshold, at step S103, the input power supply voltage control unit 15 controls the AC stabilized power supply 11 to output input power supply voltage that is higher than the present value. In other words, the input power supply voltage control unit 15 generates a voltage command value that causes the AC stabilized power supply 11 to output higher input power supply voltage instead of the input power supply voltage that has been output by the AC stabilized power supply 11 and outputs the voltage command value to the AC stabilized power supply 11. In this way, the AC stabilized power supply 11 supplies, to the converter 12, higher input power supply voltage than the input power supply voltage that has been output until then. As described with reference to FIG. 2, as the input power supply voltage to the converter 12 increases, the DC link voltage becomes higher and the output of the motor 3 becomes larger. However, with the DC link voltage heightened, the switching loss of the inverter 13 increases and the temperature of the inverter 13 rises (step S104). At the same time, current flowing in the converter 12 and current flowing in the motor 3 are reduced, and the temperature of the converter 12 and the temperature of the motor 3 decrease. After step S104, the process returns to step S101.

At step S102, when the temperature of the inverter 13 is not determined as being lower than the inverter lower limit temperature threshold, the process advances to step S105.

At step S105, the input power supply voltage control unit 15 determines whether the temperature of the inverter 13 acquired by the temperature acquisition unit 14 exceeds a preset inverter upper limit temperature threshold. When the temperature of the inverter 13 is determined as exceeding the inverter upper limit temperature threshold, the process advances to step S106, though, when the temperature of the inverter 13 is not determined as exceeding the inverter upper limit temperature threshold, the process returns to step S101. The inverter upper limit temperature threshold may be set to such a temperature that heat generation does not damage or shorten the life of the inverter 13 or such a temperature that the inverter 13 does not malfunction (overheat).

At step S105, when the temperature of the inverter 13 is not determined as exceeding the inverter upper limit temperature threshold, the input power supply voltage control unit 15 generates a voltage command value that maintains the input power supply voltage that is being output by the AC stabilized power supply 11, and outputs the voltage command value to the AC stabilized power supply 11. Then, the process returns to step S101.

On the other hand, when the temperature of the inverter 13 is determined as exceeding the inverter upper limit temperature threshold at step S105, at step S106, the input power supply voltage control unit 15 controls the AC stabilized power supply 11 to output input power supply voltage that is lower than the present value. In other words, the input power supply voltage control unit 15 generates a voltage command value that causes the AC stabilized power supply 11 to output lower input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, lower input power supply voltage than the input power supply voltage that has been output until then. As described with reference to FIG. 2, as the input power supply voltage to the converter 12 decreases, the DC link voltage becomes lower; with the DC link voltage lowered, the switching loss of the inverter 13 decreases and the temperature of the inverter 13 falls (step S107). In this way, the temperature of the inverter 13 does not exceed the inverter upper limit temperature threshold. Thus, damages and the shortened life of the inverter 13 due to heat generation can be avoided. Moreover, malfunction (overheat) of the inverter 13 can be prevented. At the same time, current flowing in the converter 12 and current flowing in the motor 3 are raised, and the temperature of the converter 12 and the temperature of the motor 3 increase. After step S107, the process returns to step S101.

In this way, according to the first mode, the output of the motor 3 can be increased while preventing excessive heat generation from the inverter 13. Excessive heat generation can also be prevented for the temperature of the converter 12 and the temperature of the motor 3. Note that, in the case of the first mode, as the temperature of the converter 12 is not used for controlling the input power supply voltage of the converter 12, the temperature acquisition unit 14 equipped in the converter 12 can be omitted.

Figure 4:
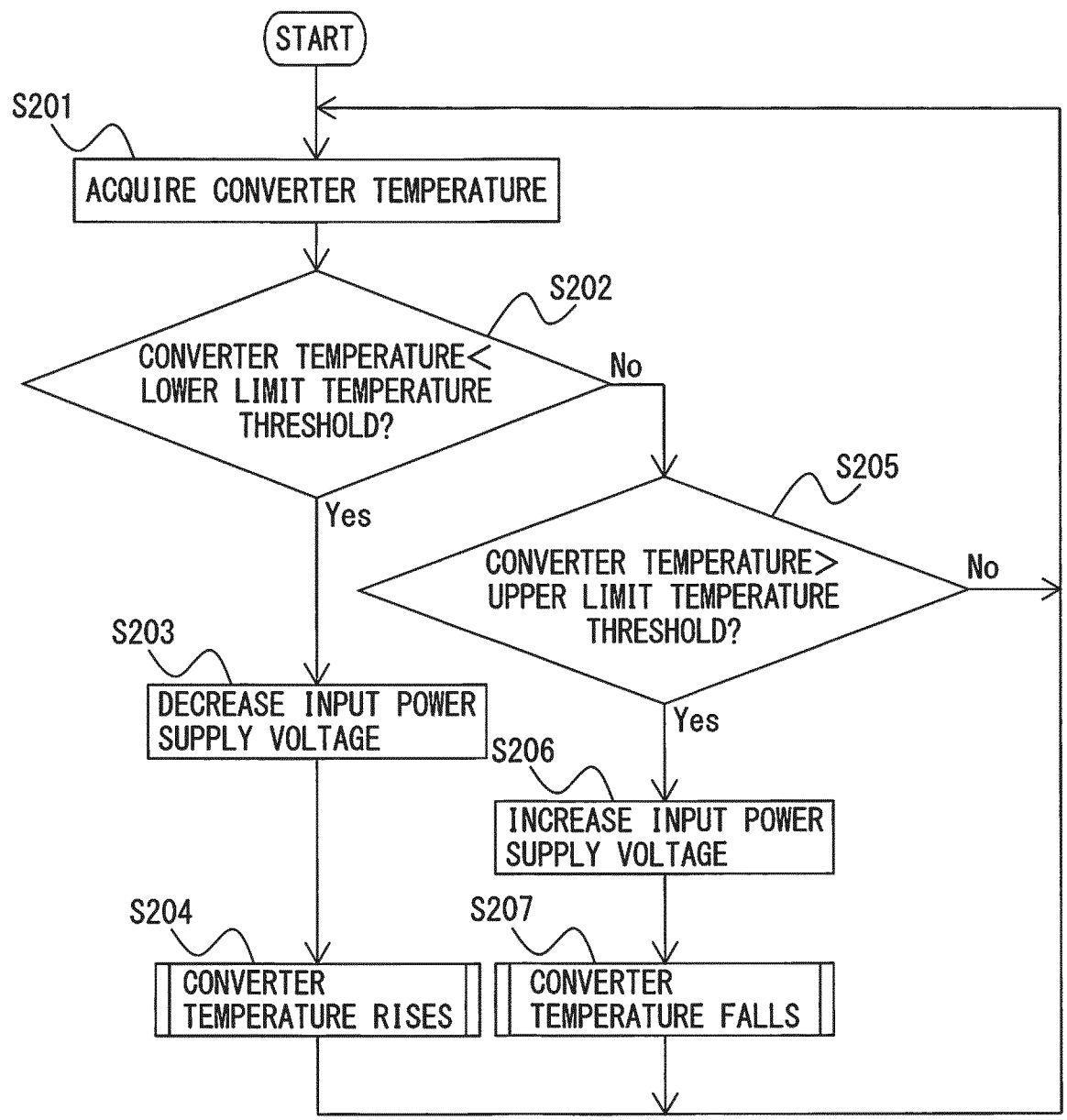
FIG. 4 is a flowchart indicating a second mode of input power supply voltage control of the motor drive apparatus according to the first embodiment of the disclosure.

Next, a second mode for controlling input power supply voltage to the converter 12 will be described. In the second mode, input power supply voltage to the converter 12 is controlled so that the temperature of the converter 12 can be raised to the highest extent possible. According to the second mode, the motor 3 can be controlled with high accuracy while preventing excessive heat generation from the converter 12 and the motor 3. FIG. 4 is a flowchart indicating the second mode of input power supply voltage control of the motor drive apparatus according to the first embodiment of the disclosure.

In the motor drive apparatus 1 of the present embodiment, when the magnetic contactor 25 performs a close operation so as to electrically connect the AC stabilized power supply 11 and the converter 12, and the motor control unit 20 drives the motor 3 by controlling a power conversion operation of the converter 12 and the inverter 13, at step S201, the temperature acquisition unit 14 acquires the temperature of the converter 12. The acquired temperature of the converter 12 is informed to the input power supply voltage control unit 15.

At step S202, the input power supply voltage control unit 15 determines whether the temperature of the converter 12 acquired by the temperature acquisition unit 14 is lower than a preset converter lower limit temperature threshold. When the temperature of the converter 12 is determined as being lower than the converter lower limit temperature threshold, the process advances to step S203, or, when the temperature of the converter 12 is not determined as being lower than the converter lower limit temperature threshold, the process advances to step S205. The converter lower limit temperature threshold may be set to a value smaller than the converter upper limit temperature threshold as will be described later. The difference between the converter upper limit temperature threshold and the converter lower limit temperature threshold is equivalent to the hysteresis width of the temperature of the converter 12.

At step S202, when the temperature of the converter 12 is determined as being lower than the converter lower limit temperature threshold, at step S203, the input power supply voltage control unit 15 controls the AC stabilized power supply 11 to output input power supply voltage that is lower than the present value. In other words, the input power supply voltage control unit 15 generates a voltage command value that causes the AC stabilized power supply 11 to output lower input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, lower input power supply voltage than the input power supply voltage that has been output until then. As described with reference to FIG. 2, as the input power supply voltage to the converter 12 decreases, the DC link voltage is lowered and current flowing in the converter 12 and current flowing in the motor 3 increase. As the result, the temperature of the converter 12 and the temperature of the motor 3 rise (step S204). At the same time, with the DC link voltage lowered, the switching loss of the inverter 13 decreases and the temperature of the inverter 13 is lowered. Further, since the inverter 13 converts such low DC link voltage into AC voltage for driving the motor at a constant output, the actual resolution of a voltage command for the inverter 13 is improved, enabling controlling of the motor 3 with high accuracy. After step S204, the process returns to step S201.

At step S202, when the temperature of the converter 12 is not determined as being Lower than the converter lower limit temperature threshold, the process advances to step S205.

At step S205, the input power supply voltage control unit 15 determines whether the temperature of the converter 12 acquired by the temperature acquisition unit 14 exceeds a preset converter upper limit temperature threshold. When the temperature of the converter 12 is determined as exceeding the converter upper limit temperature threshold, the process advances to step S206, though, when the temperature of the converter 12 is net determined as exceeding the converter upper limit temperature threshold, the process returns to step S201. The converter upper limit temperature threshold may be set to such a temperature that heat generation does not damage or shorten the life of the converter 12 or such a temperature that the converter 12 does not malfunction (overheat).

At step S205, when the temperature of the converter 12 is not determined as exceeding the converter upper limit temperature threshold, the input power supply voltage control unit 15 generates a voltage command value that maintains the input power supply voltage that is being output by the AC stabilized power supply 11, and outputs the voltage command value to the AC stabilized power supply 11. Then, the process returns to step S201.

On the other hand, when the temperature of the converter 12 is determined as exceeding the converter upper limit temperature threshold at step S205, at step S206, the input power supply voltage control unit 15 controls the AC stabilized power supply 11 to output input power supply voltage that is higher than the present value. In other words, the input power supply voltage control unit 15 generates a voltage command value that causes the AC stabilized power supply 11 to output higher input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, higher input power supply voltage than the input power supply voltage that has been output until then. As described with reference to FIG. 2, as the input power supply voltage to the converter 12 increases, the DC link voltage becomes higher and current flowing in the converter and current flowing in the motor 3 decrease. As the result, the temperature of the converter 12 and the temperature of the motor 3 fall (step S207). On the other hand, with the DC link voltage heightened, the switching loss of the inverter 13 increases and the temperature of the inverter 13 is raised. After step S207, the process returns to step S201.

In this way, according to the second mode, the motor 3 can be controlled with high accuracy while preventing excessive heat generation from the converter 12 and the motor 3. Excessive heat generation can also be prevented for the temperature of the inverter 13. Note that, in the case of the second mode, as the temperature of the inverter 13 is not used for controlling the input power supply voltage to the converter 12, the temperature acquisition unit 14 equipped in the inverter 13 can be omitted.

Figure 5:
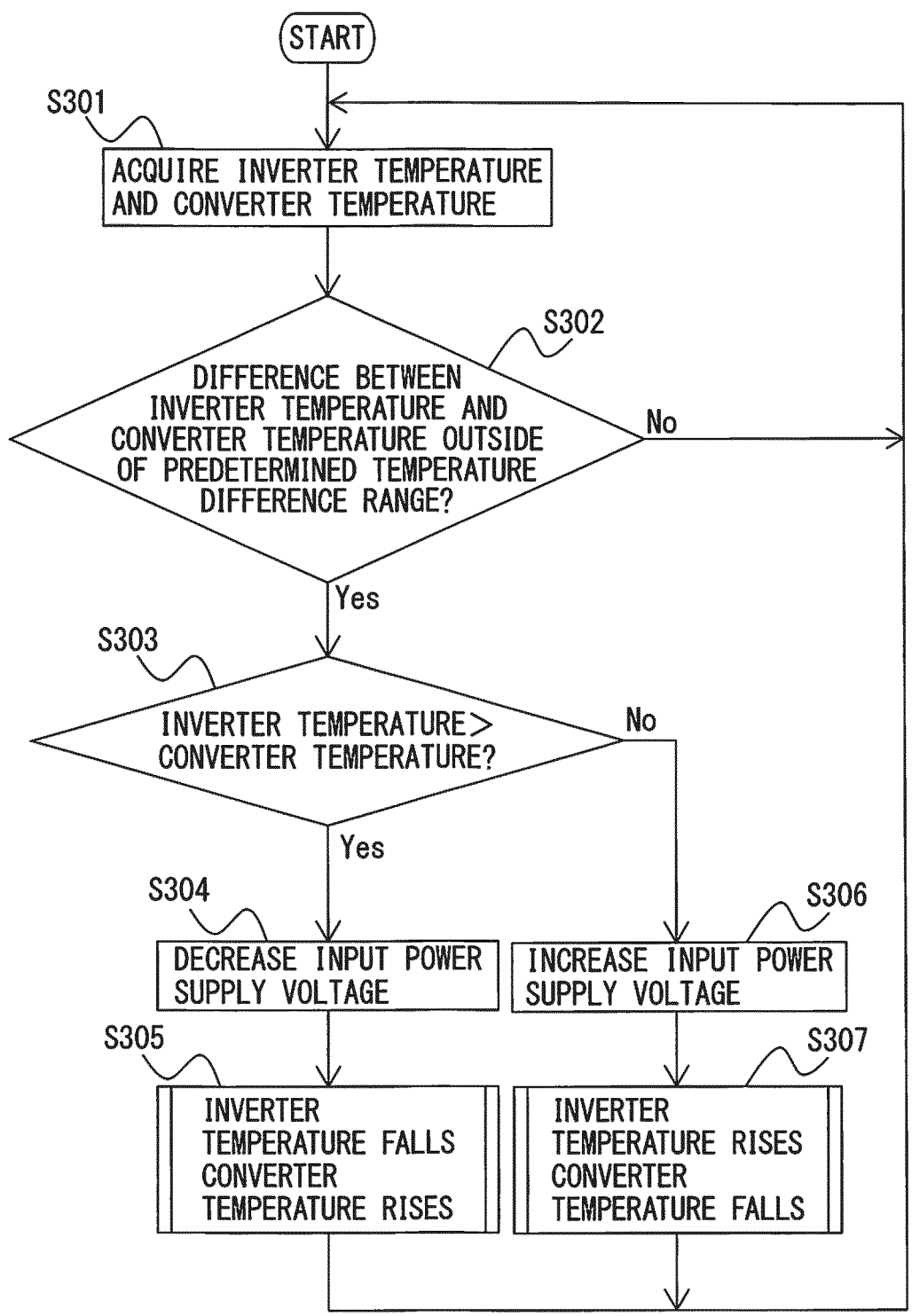
FIG. 5 is a flowchart indicating a third mode of input power supply voltage control of the motor drive apparatus according to the first embodiment of the disclosure.

Next, a third mode for controlling input power supply voltage to the converter 12 will be described. In the third mode, input power supply voltage to the converter 12 is controlled so that the temperature of the converter 12 and the temperature of the inverter 13 are leveled. According to the third mode, since the heat generation of the converter 12 and the inverter 13 is leveled, for example, the lives of the converter 12 and inverter 13 can be generally the same lengths, thereby reducing labor of maintenance and replacement works. FIG. 5 is a flowchart indicating the third mode of input power supply voltage control of the motor drive apparatus according to the first embodiment of the disclosure.

In the motor drive apparatus 1 of the present embodiment, when the magnetic contactor 25 performs a close operation so as to electrically connect the AC stabilized power supply 11 and the converter 12, and the motor control unit 20 drives the motor 3 by controlling a power conversion operation of the converter 12 and the inverter 13, at step S301, the temperature acquisition units 14 acquire the temperature of the converter 12 and the temperature of the inverter 13. The acquired temperature of the converter 12 and temperature of the inverter 13 are informed to the input power supply voltage control unit 15.

At step S302, the input power supply voltage control unit 15 determines whether difference between the temperature of inverter 13 and the temperature of the converter 12 that are acquired by the temperature acquisition units 14 is outside of a preset temperature difference range. When the difference between the temperature of inverter 13 and the temperature of the converter 12 is determined as being outside of the predetermined temperature difference range, the process advances to step S303, or, when the difference between the temperature of inverter 13 and the temperature of the converter 12 is not determined as being outside of the predetermined temperature difference range (i.e., when determined as within the predetermined temperature difference range), the process returns to step S301. As the "temperature difference range" is set to values closer to 0, heat generation of the converter 12 and heat generation of the inverter 13 can be better leveled.

At step S302, when the difference between the temperature of the inverter 13 and the temperature of the converter 12 is not determined as outside of the predetermined temperature difference range (i.e., when determined as within the predetermined temperature difference range), the input power supply voltage control unit 15 generates a voltage command value that maintains the input power supply voltage that is being output by the AC stabilized power supply 11, and outputs the voltage command value to the AC stabilized power supply 11. Then, the process returns to step S301.

At step S302, when the difference between the temperature of the inverter 13 and the temperature of the converter 12 is determined as being outside of the predetermined temperature difference range, at step S303, the input power supply voltage control unit 15 determines whether the temperature of the inverter 13 is higher than the temperature of the converter 12. When it is determined that the temperature of the inverter 13 is higher than the temperature of the converter 12, the process advances to step S304, or, when it is not determined that the temperature of the inverter 13 is higher than the temperature of the converter 12 (i.e., the temperature of the inverter 13 is lower than the temperature of the converter 12), the process advances to step S306.

When it is determined that the temperature of the inverter 13 is higher than the temperature of the converter 12 at step S303, at step S304, the input power supply voltage control unit 15 controls the AC stabilized power supply 11 to output input power supply voltage that is lower than the present value. In other words, the input power supply voltage control unit 15 generates a voltage command value that causes the AC stabilized power supply 11 to output lower input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, higher input power supply voltage than the input power supply voltage that has been output until then. As described with reference to FIG. 2, as the input power supply voltage to the converter 12 decreases, the DC link voltage becomes lower, and with the DC link voltage lowered, the switching loss of the inverter 13 is reduced and the temperature of the inverter 13 falls (step S305). At the same time, current flowing in the converter 12 and current flowing in the motor 3 increase, and the temperature of the converter 12 and the temperature of the motor 3 are raised (step S305). After step S305, the process returns to step S301.

When it is not determined that the temperature of the inverter 13 is higher than the temperature of the converter 12 at step S303, (i.e., the temperature of the inverter 13 is lower than the temperature of the converter 12), at step S306, the input power supply voltage control unit 15 controls the AC stabilized power supply 11 to output input power supply voltage that is higher than the present value. In other words, the input power supply voltage control unit 15 generates a voltage command value that causes the AC stabilized power supply 11 to output higher input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, higher input power supply voltage than the input power supply voltage that has been output until then. As described with reference to FIG. 2, as the input power supply voltage to the converter 12 increases, the DC link voltage becomes higher, current flowing in the converter 12 and current flowing in the motor 3 decrease, and the temperature of the converter 12 and the temperature of the motor 3 fall (step S307). At the same time, with the DC link voltage heightened, the switching loss of the inverter 13 increases and the temperature of the inverter 13 is raised (step S307). After step S307, the process returns to step S301.

In this way, according to the third mode, since heat generation of the converter 12 and the inverter 13 is leveled, for example, the lives of the converter 12 and the inverter 13 can be generally the same lengths, whereby labor of maintenance and replacement works can be reduced. For example, when the converter 12 and the inverter 13 are configured by the same kinds of internal electrolytic capacitors and cooling fans, degradation of parts attributable to generated heat progress in nearly the same speed, and the lives of the converter 12 and the inverter 13 can be maintained to generally the same lengths, which enables efficient maintenance and replacement works.

Next, the motor drive apparatus according to a second embodiment of the disclosure will be described.

Figure 6:
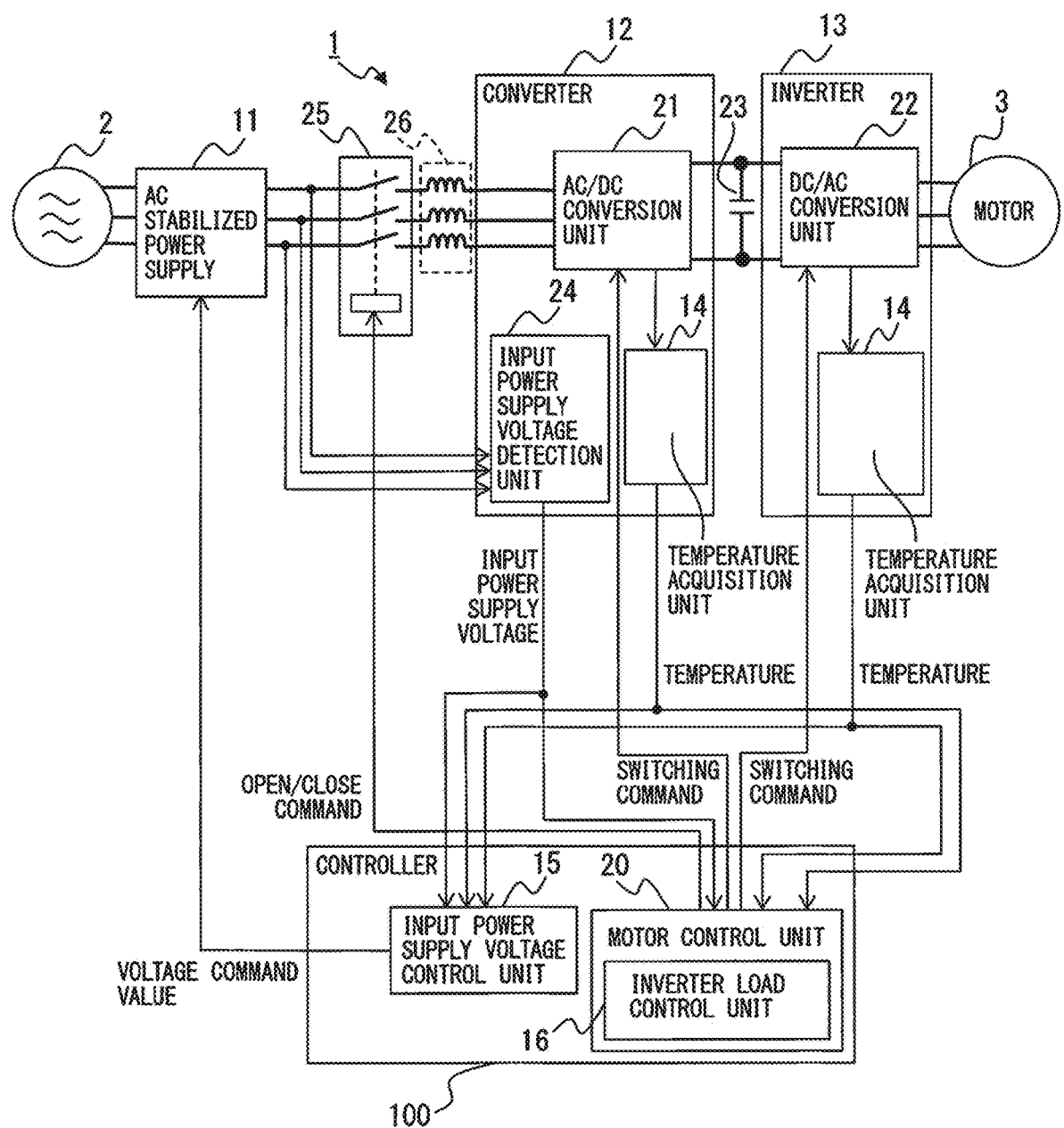
FIG. 6 is a diagram indicating a motor drive apparatus according to a second embodiment of the present disclosure.

FIG. 6 is a diagram illustrating the motor drive apparatus according to the second embodiment of the disclosure. The motor drive apparatus 1 according to the second embodiment is further developed from the third mode of controlling the input power supply voltage to the converter 12 in the first embodiment. In the third mode of controlling the input power supply voltage to the converter 12 in the first embodiment, when, at step S302 of FIG. 5, difference between the temperature of the inverter 13 and the temperature of the converter 12 is not determined as being outside of a predetermined temperature difference range (i.e., within the predetermined temperature difference range), the present state is maintained without changing the input power supply voltage, and the process returns to step S301. Whereas, in the second embodiment, when the difference between the temperature of the inverter 13 and the temperature of the converter 12 is not determined as being outside of a predetermined temperature difference range and when predetermined conditions are satisfied, the temperature of the converter 12 and the temperature of the inverter 13 are controlled by changing load applied to the inverter 13. As such, the motor drive apparatus 1 according to the second embodiment further includes an inverter load control unit 16 for controlling a change of load applied to the inverter 13 when predetermined conditions are satisfied, in addition to the motor drive apparatus 1 according to the first embodiment illustrated in FIG. 1. Thus, in the motor drive apparatus 1 according to the second embodiment, control of the temperature of the converter 12 and the inverter 13 (as well as, the motor 3) is performed by either controlling the AC stabilized power supply 11 by the input power supply voltage control unit 15 or controlling a change of load applied to the inverter 13 by the inverter load control unit 16. The inverter load control unit 16 is provided inside the motor control unit 20.

The inverter load control unit 16 controls to apply increased load to the inverter 13, instead of load that has been applied to the inverter 13 until then, when difference between the temperature of the inverter 13 and the temperature of the converter 12 acquired by the temperature acquisition unit 14 is within a predetermined temperature difference range, as well as, the temperature of the inverter 13 is lower than an inverter lower limit temperature threshold and the temperature of the converter 12 is lower than a converter lower limit temperature threshold. Alternatively, the inverter load control unit 16 controls to apply decreased load to the inverter 13, instead of load that has been applied to the inverter 13 until then, when difference between the temperature of the inverter 13 and the temperature of the converter 12 is within a temperature difference range, as well as, the temperature of the inverter 13 exceeds an inverter upper limit temperature threshold, or when difference between the temperature of the inverter 13 and the temperature of the converter 12 is within a predetermined temperature difference range, as well as, the temperature of the converter 12 exceeds a converter upper limit temperature threshold.

For example, the load applied to the inverter 13 can be changed by changing a PWM frequency that is used in PWM switching control for the power devices in the inverter 13. As the PWM frequency is higher, the switching loss of the power devices in the inverter 13 increases, and the load applied to the inverter 13 increases. In other words, the inverter load control unit 16 increases load applied to the inverter 13 by changing a PWM frequency used in PWM switching control for the power devices to a higher PWM frequency and decreases load applied to the inverter 13 by changing a PWM frequency used in PWM switching control for the power devices to a lower PWM frequency. When the inverter load control unit 16 changes a PWM frequency used in PWM switching control for the power devices to a higher PWM frequency, the load applied to the inverter 13 increases, while responsiveness of the inverter 13 becomes higher. In this case, the heat generation of the motor 3 is reduced.

Alternatively, for example, the load applied to the inverter 13 can be changed by changing the AC voltage that is output from the inverter 13 for changing the output of the motor 3. In other words, the inverter load control unit 16 increases the load applied to the inverter 13 by controlling the AC voltage that is output from the inverter 13 in such a way that the output of the motor 3 becomes larger, and the inverter load control unit 16 decreases the load applied to the inverter 13 by controlling the AC voltage that is output from the inverter 13 in such a way that the output of the motor becomes smaller.

Figure 7:
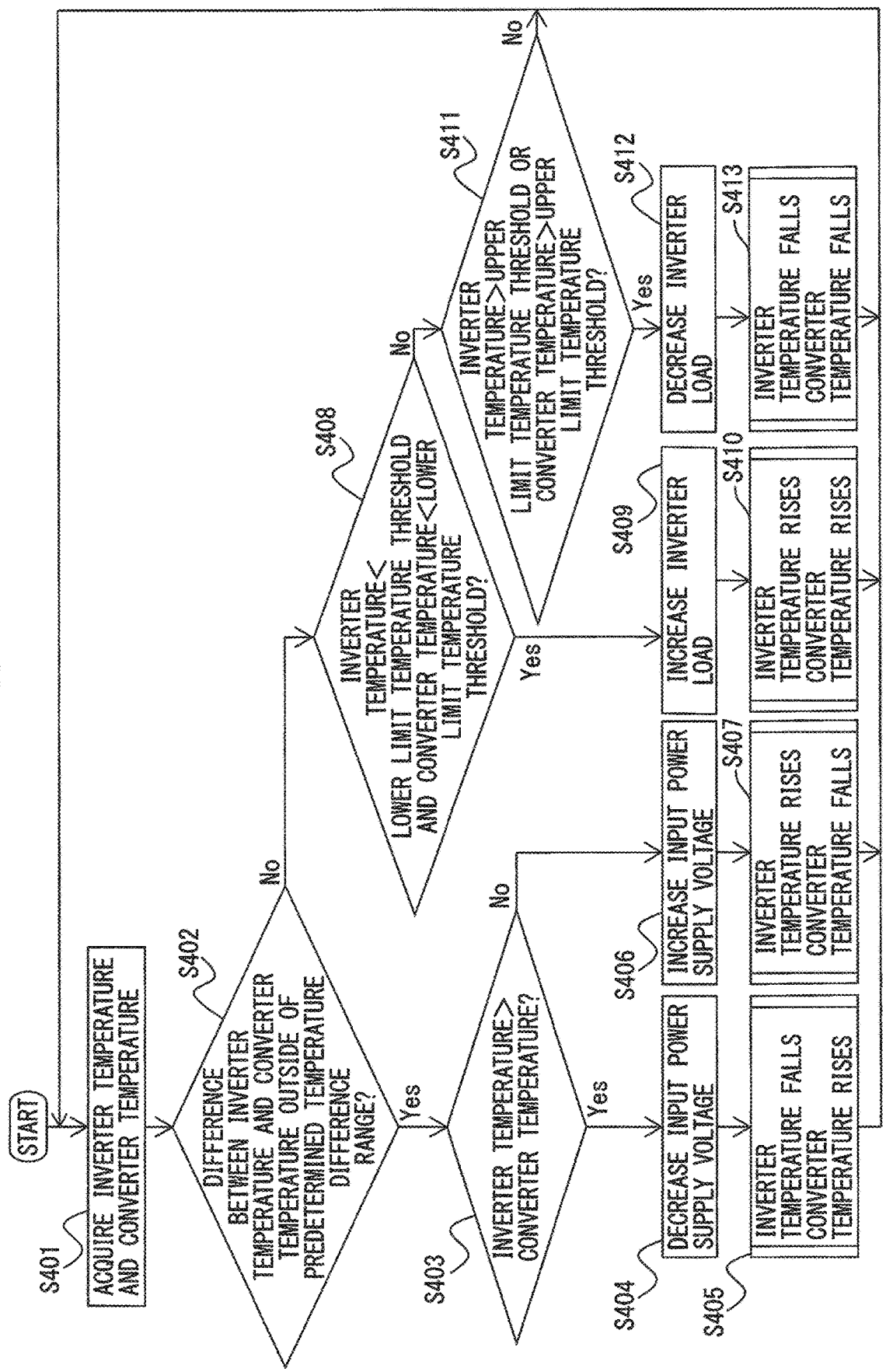
FIG. 7 is a flowchart indicating input power supply voltage control of the motor drive apparatus according to the second embodiment of the disclosure.

FIG. 7 is a flowchart illustrating input power supply voltage control of the motor drive apparatus according to the second embodiment of the disclosure.

In the motor drive apparatus 1 of the present embodiment, when the magnetic contactor 25 performs a close operation so as to electrically connect the AC stabilized power supply 11 and the converter 12, and the motor control unit 20 drives the motor 3 by controlling a power conversion operation of the converter 12 and the inverter 13, at step S401, the temperature acquisition unit 14 acquires the temperature of the converter 12 and the temperature of the inverter 13. The acquired temperature of the converter 12 and temperature of the inverter 13 are informed to the input power supply voltage control unit 15.

At step S402, the input power supply voltage control unit 15 determines whether difference between the temperature of the inverter 13 and the temperature of the converter 12 that are acquired by the temperature acquisition units 14 is outside of a preset temperature difference range. When the difference between the temperature of inverter 13 and the temperature of the converter 12 is determined as being outside of the predetermined temperature difference range, the process advances to step S403, or, when the difference between the temperature of inverter 13 and the temperature of the converter 12 is not determined as being outside of the predetermined temperature difference range (i.e., when determined as within the predetermined temperature difference range), the process advances to step S408. In particular, when the temperature ratings of the converter 12 and the inverter 13 are the same, as the "temperature difference range" is set to values closer to 0, heat generation of the converter 12 and heat generation of the inverter 13 can be better leveled.

At step S402, when the difference between the temperature of the inverter 13 and the temperature of the converter 12 is determined as being outside of the predetermined temperature difference range, at step S403, the input power supply voltage control unit 15 determines whether the temperature of the inverter 13 is higher than the temperature of the converter 12. When it is determined that the temperature of the inverter 13 is higher than the temperature of the converter 12, the process advances to step S404, and, when it is not determined that the temperature of the inverter 13 is higher than the temperature of the converter 12 (i.e., the temperature of the inverter 13 is lower than the temperature of the converter 12), the process advances to step S406.

At step S403, when it is determined that the temperature of the inverter 13 is higher than the temperature of the converter 12, at step S404, the input power supply voltage control unit 15 controls the AC stabilized power supply 11 to output lower input power supply voltage than the present value. In other words, the input power supply voltage control unit 15 generates a voltage command value that causes the AC stabilized power supply 11 to output lower input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, lower input power supply voltage than the input power supply voltage that has been output until then. As described with reference to FIG. 2, as the input power supply voltage to the converter 12 decreases, the DC link voltage becomes lower, and with the DC link voltage lowered, the switching loss of the inverter 13 is reduced and temperature of the inverter 13 falls (step S405). At the same time, current flowing in the converter 12 and current flowing in the motor 3 increase, and the temperature of the converter 12 and the temperature of the motor 3 are raised (step S405). After step S405, the process returns to step S401.

When it is not determined that the temperature of the inverter 13 is higher than the temperature of the converter 12 at step S403, (i.e., the temperature of the inverter 13 lower than the temperature of the converter 12), at step S406, the input power supply voltage control unit 15 controls the AC stabilized power supply 11 to output input power supply voltage that is higher than the present value. In other words, the input power supply voltage control unit 15 generates a voltage command value that causes the AC stabilized power supply 11 to output higher input power supply voltage instead of the input power supply voltage that has been output by the AC stabilized power supply 11 until then and outputs the voltage command value to the AC stabilized power supply 11. In this way, the AC stabilized power supply 11 supplies, to the converter 12, higher input power supply voltage than the input power supply voltage that has been output until then. As described with reference to FIG. 2, as the input power supply voltage to the converter 12 increases, the DC link voltage becomes higher, current flowing in the converter 12 and current flowing in the motor 3 decrease, and the temperature of the converter 12 and temperature of the motor 3 fall (step S407). At the same time, with the DC link voltage heightened, the switching loss of the inverter 13 increases and the temperature of the inverter 13 is raised (step S407). After step S407, the process returns to step S401.

At step S402, when the difference between the temperature of inverter 13 and the temperature of the converter 12 is determined as being outside of the predetermined temperature difference range, at step S408, the inverter load control unit 16 determines whether the temperature of the inverter 13 is lower than the inverter lower limit temperature threshold, as well as, whether the temperature of the converter 12 is lower than the converter lower limit temperature threshold. At step S408, when it is determined that the temperature of the inverter 13 is lower than the inverter lower limit temperature threshold, as well as, the temperature of the converter 12 is lower than the converter lower limit temperature threshold, the process advances to step S409, if not, the process advances to step S411. The inverter lower limit temperature threshold may be set to a smaller value than the inverter upper limit temperature threshold. The difference between the inverter upper limit temperature threshold and the inverter lower limit temperature threshold is equivalent to the hysteresis width of the temperature of the inverter 13. The converter lower limit temperature threshold may be set to a smaller value than the converter upper limit temperature threshold. The difference between the converter upper limit temperature threshold and the converter lower limit temperature threshold is equivalent to the hysteresis width of the temperature of the converter 12.

When it is determined that the temperature of the inverter 13 is lower than the inverter lower limit temperature threshold, as well as, the temperature of the converter 12 is lower than the converter lower limit temperature threshold at step S408, at step S409, the inverter load control unit 16 controls to apply increased load to the inverter 13 in addition to the load that has been applied to the inverter 13 until then. In this way, the temperature of the inverter 13 and the temperature of the converter 12 increase (step S410). After step S407, the process returns to step S401.

When it is not determined that the temperature of the inverter 13 is lower than the inverter lower limit temperature threshold, as well as, the converter 12 is lower than the converter lower limit temperature threshold at step S408, at step S411, the inverter load control unit 16 determines whether any of the conditions of whether the temperature of the inverter 13 exceeds the inverter upper limit temperature threshold and whether the temperature of the converter 12 exceeds the converter upper limit temperature threshold is satisfied. When it is determined that the temperature of the inverter 13 exceeds the inverter upper limit temperature threshold, the process advances to step S412. Likewise, when it is determined that the temperature of the converter 12 exceeds the converter upper limit temperature threshold, the process also advances to step S412.

At step S412, the inverter load control unit 16 controls to apply decreased load to the inverter 13 instead of the load that has been applied to the inverter 13 until then. In this way, the temperature of the inverter 13 and the temperature of the converter 12 fall (step S413). After step S413, the process returns to step S401.

At step S411, when it is determined that the temperature of the inverter 13 does not exceed the inverter upper limit temperature threshold, since the temperature of the inverter 13 is determined as not lower than the inverter lower limit temperature threshold at the previous step S408, the temperature of the inverter 13 is between the inverter lower limit temperature threshold and the inverter upper limit temperature threshold. In such a case, the process returns to step S401. The inverter load control unit 16 maintains the load of the inverter 13 at the present state, and the input power supply voltage control unit 15 generates a voltage command value that maintains the input power supply voltage that is being output by the AC stabilized power supply 11 and outputs the voltage command value to the AC stabilized power supply 11.

Further, at step S411 when it is determined that the temperature of the converter 12 does not exceed a converter upper limit temperature threshold, since the temperature of the converter 12 is determined as not lower than the converter lower limit temperature threshold at the previous step S408, the temperature of the converter 12 is between the converter lower limit temperature threshold and the converter upper limit temperature threshold. In such a case, the process also returns to step S401. The inverter load control unit 16 maintains the load of the inverter 13 at the present state, and the input power supply voltage control unit 15 generates a voltage command value that maintains the input power supply voltage that is being output by the AC stabilized power supply 11 and outputs the voltage command value to the AC stabilized power supply 11.

In this way, according to the second embodiment, when the input power supply voltage control unit 15 controls the AC stabilized power supply 11, heat generation of the converter 12 and the inverter 13 is leveled, thus, for example, the lives of the converter and the inverter 13 can be generally the same lengths, whereby labor of maintenance and replacement works can be reduced. Moreover, according to the second embodiment, when the inverter load control unit 16 controls a change of load applied to the inverter 13, the output of the motor 3 can be enlarged while preventing excessive heat generation from the inverter 13, and accurate motor control is enabled.

Note that the above-described input power supply voltage control unit 15, inverter load control unit 16, motor control unit 20 and input power supply voltage detection unit 21 may be configured, for example, by means of a software program, or configured by a combination of a variety of electric circuits and a software program. For example, to configure the units by a software program, the above-described functions of the units can be realized by causing a processor, such as MPU or DSP, inside the controller 100 to operate in accordance with this software program. Alternatively, the input power supply voltage control unit 15, inverter load control unit 16 and motor control unit 20 may be realized as semiconductor circuits on which a software program for realizing the units are written. Further, when the temperature of the converter 12 and/or the inverter 13 is acquired by estimation based on a software simulation, instead of actual measurement by a temperature sensor, the function of the temperature acquisition unit 14 can be realized by causing the processor, such as MPU or DSP, to execute a temperature estimation program. In such a case, the temperature acquisition unit 14 based on the temperature estimation program is provided in the processor inside the controller 100 or inside the processor of an external computer (not illustrated).

When the above-described motor drive apparatus 1 is used as a driving source of, for example, a machine tool, a robot, forging machinery, an injection molding machine, or industrial machinery, generation of heat from the converter 12, the inverter 13 and the motor 3 can be controlled, making thermal displacement small, and, as the result, improving processing accuracy and extending the life of the bearing of the motor 3.

According to an embodiment of the disclosure, a motor drive apparatus that can efficiently control a motor while suppressing heat generation from each unit can be realized.

The invention claimed is:

1. A motor drive apparatus, comprising:
   an AC stabilized power supply configured to convert AC voltage of a commercial AC power source into input power supply voltage and output the input power supply voltage;
   a converter configured to convert the input power supply voltage into DC voltage and output the DC voltage to a DC link;
   an inverter configured to convert the DC voltage at the DC link into AC voltage for driving a motor and output the AC voltage; and
   an input power supply voltage control unit configured to control the input power supply voltage that is output by the AC stabilized power supply according to heat generated by at least one of the converter, the inverter or the motor.

2. A motor drive apparatus, comprising:
   an AC stabilized power supply configured to convert AC voltage of a commercial AC power source into input power supply voltage and output the input power supply voltage;
   a converter configured to convert the input power supply voltage into DC voltage and output the DC voltage to a DC link;
   an inverter configured to convert the DC voltage at the DC link into AC voltage for driving a motor and output the AC voltage;
   an input power supply voltage control unit configured to control the input power supply voltage that is output by the AC stabilized power supply; and
   a temperature acquisition unit configured to acquire temperature of at least one of the converter and the inverter,
   wherein the input power supply voltage control unit controls the input power supply voltage that is output by the AC stabilized power supply according to the temperature acquired by the temperature acquisition unit.

3. The motor drive apparatus according to claim 2, wherein
   the input power supply voltage control unit generates a voltage command value for controlling the input power supply voltage that is output by the AC stabilized power supply according to the temperature acquired by the temperature acquisition unit and sends the voltage command value to the AC stabilized power supply, and
   the AC stabilized power supply converts AC voltage of the commercial AC power source into input power supply voltage according to the voltage command value received from the input power supply voltage control unit and outputs the input power supply voltage.

4. The motor drive apparatus according to claim 3, wherein,
   when the temperature of the inverter acquired by the temperature acquisition unit is lower than a preset inverter lower limit temperature threshold, the input power supply voltage control unit generates the voltage command value that causes the AC stabilized power supply to output higher input power supply voltage instead of the input power supply voltage that has been output by the AC stabilized power supply,
   when the temperature of the inverter exceeds an inverter upper limit temperature threshold that is preset to a larger value than the inverter lower limit temperature threshold, the input power supply voltage control unit generates the voltage command value that causes the AC stabilized power supply to output lower input power supply voltage instead of the input power supply voltage that has been output by the AC stabilized power supply, or
   when the temperature of the inverter is between the inverter lower limit temperature threshold and the inverter upper limit temperature threshold, the input power supply voltage control unit generates the voltage command value that maintains the input power supply voltage that is being output by the AC stabilized power supply.

5. The motor drive apparatus according to claim 3, wherein,
   when the temperature of the converter acquired by the temperature acquisition unit is lower than a preset converter lower limit temperature threshold, the input power supply voltage control unit generates the voltage command value that causes the AC stabilized power supply to output lower input power supply voltage instead of the input power supply voltage that has been output by the AC stabilized power supply,
   when the temperature of the converter exceeds a converter upper limit temperature threshold that is preset to a larger value than the converter lower limit temperature threshold, the input power supply voltage control unit generates the voltage command value that causes the AC stabilized power supply to output higher input power supply voltage instead of the input power supply voltage that has been output by the AC stabilized power supply, or
   when the temperature of the converter is between the converter lower limit temperature threshold and the converter upper limit temperature threshold, the input power supply voltage control unit generates the voltage command value that maintains the input power supply voltage that is being output by the AC stabilized power supply.

6. The motor drive apparatus according to claim 3, wherein,
   when difference between the temperature of the inverter and the temperature of the converter acquired by the temperature acquisition unit is outside of a preset temperature difference range, as well as, the temperature of the inverter is higher than the temperature of the converter, the input power supply voltage control unit generates the voltage command value that causes the AC stabilized power supply to output lower input power supply voltage instead of the input power supply voltage that has been output by the AC stabilized power supply, or
   when difference between the temperature of the inverter and the temperature of the converter acquired by the temperature acquisition unit is outside of the temperature difference range, as well as, the temperature of the inverter is lower than the temperature of the converter, the input power supply voltage control unit generates the voltage command value that causes the AC stabilized power supply to output higher input power supply voltage instead of the input power supply voltage that has been output by the AC stabilized power supply.

7. The motor drive apparatus according to claim 6, wherein,
   when difference between the temperature of the inverter and the temperature of the converter is within the temperature difference range, the input power supply voltage control unit generates the voltage command value that maintains input power supply voltage that is being output by the AC stabilized power supply.

8. The motor drive apparatus according to claim 6, wherein, when difference between the temperature of the inverter and the temperature of the converter is within the temperature difference range, as well as, the temperature of the inverter is between a preset inverter lower limit temperature threshold and an inverter upper limit temperature threshold that is preset to a larger value than the inverter lower limit temperature threshold, or when difference between the temperature of the inverter and the temperature of the converter is within the temperature difference range, as well as, the temperature of the converter is between a preset converter lower limit temperature threshold and a converter upper limit temperature threshold that is preset to a larger value than the converter lower limit temperature threshold, the input power supply voltage control unit generates the voltage command value that maintains the input power supply voltage that is being output by the AC stabilized power supply.

9. The motor drive apparatus according to claim 8, further comprising:

an inverter load control unit configured to further increase load applied to the inverter, when difference between the temperature of the inverter and the temperature of the converter is within the temperature difference range, as well as, the temperature of the inverter is lower than the inverter lower limit temperature threshold and the temperature of the converter is lower than the converter lower limit temperature threshold, or further decrease load applied to the inverter, when difference between the temperature of the inverter and the temperature of the converter is within the temperature difference range, as well as, the temperature of the inverter exceeds the inverter upper limit temperature threshold, or when difference between the temperature of the inverter and the temperature of the converter is within the temperature difference range, as well as, the temperature of the converter exceeds the converter upper limit temperature threshold.

10. The motor drive apparatus according to claim 9, wherein the inverter load control unit increases load applied to the inverter by changing a PWM frequency that is used in PWM switching control for power devices in the inverter to a higher PWM frequency, and decreases load applied to the inverter by changing the PWM frequency to a lower PWM frequency.

11. The motor drive apparatus according to claim 9, wherein the inverter load control unit increases load applied to the inverter by controlling AC voltage that is output from the inverter in such a way that output of the motor becomes larger output, and decreases load applied to the inverter by controlling AC voltage that is output from the inverter in such a way that output of the motor becomes smaller output.

\* \* \* \* \*